(12) United States Patent
Buck et al.

(10) Patent No.: US 11,916,339 B2
(45) Date of Patent: Feb. 27, 2024

(54) CONTACT CARRIER FOR PROVIDING ELECTRICAL CONTACT FOR WIRING IN A VEHICLE

(71) Applicant: TE Connectivity Germany GmbH, Bensheim (DE)

(72) Inventors: Carsten Buck, Lampertheim (DE); Maximilian Veihl, Seeheim-Jugenheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 729 days.

(21) Appl. No.: 16/925,930

(22) Filed: Jul. 10, 2020

(65) Prior Publication Data
US 2021/0013684 A1 Jan. 14, 2021

(30) Foreign Application Priority Data
Jul. 11, 2019 (DE) .......................... 102019118816.4

(51) Int. Cl.
*F16B 5/02* (2006.01)
*F16B 5/06* (2006.01)
*H01R 13/74* (2006.01)

(52) U.S. Cl.
CPC ............... *H01R 13/74* (2013.01); *F16B 5/02* (2013.01); *F16B 5/06* (2013.01); *F16B 2200/40* (2018.08)

(58) Field of Classification Search
CPC ...... F16B 5/06; F16B 5/0621; F16B 2200/40; F16B 5/02; F16B 5/0283; Y10T 403/58;
(Continued)

(56) References Cited

U.S. PATENT DOCUMENTS

| 4,761,144 A | * | 8/1988 | Hunt, III | ................ | H01R 13/74 29/825 |
| 5,482,476 A | * | 1/1996 | Watanabe | ............ | H01R 13/743 439/555 |

(Continued)

FOREIGN PATENT DOCUMENTS

| DE | 69606938 T2 | 10/2000 |
| DE | 202007003258 U1 | 5/2007 |

(Continued)

OTHER PUBLICATIONS

Translated Description of DE 102013110359 A1. Kollmann Hans-Josef. Receptacle Connector. Mar. 19, 2015.*
(Continued)

*Primary Examiner* — Amber R Anderson
*Assistant Examiner* — Kevin J Baynes
(74) *Attorney, Agent, or Firm* — Barley Snyder

(57) ABSTRACT

A contact carrier includes a carrier body receiving a plurality of contacts and a fastening element fastening the carrier body to a carrier element. The fastening element includes a first clamping element connected to the carrier body, a second clamping element formed on the carrier body in a shiftable manner and opposite the first clamping element, and a locking device locking the second clamping element in a position relative to the first clamping element. A distance between the first clamping element and the second clamping element can be varied by a relative movement of the second clamping element in relation to the first clamping element. The first clamping element and the second clamping element, by the locking device, exert a clamping force onto the carrier element arranged between the first clamping element and the second clamping element to hold the carrier element.

17 Claims, 5 Drawing Sheets

(58) Field of Classification Search
CPC .......... Y10T 403/581; Y10T 403/7062; H01R 12/7005; H01R 12/7029; H01R 13/645; H01R 13/74; H01R 13/741; H01R 13/743; H01R 13/745; H01R 13/746; H01R 13/748

See application file for complete search history.

(56) References Cited

U.S. PATENT DOCUMENTS

| | | | | |
|---|---|---|---|---|
| 5,791,935 | A * | 8/1998 | Yamanashi | H01R 13/645 439/489 |
| 6,017,233 | A * | 1/2000 | Fry | H01R 13/6315 439/248 |
| 6,159,030 | A * | 12/2000 | Gawron | H01R 13/6315 439/247 |
| 6,196,856 | B1 * | 3/2001 | De Villeroche | H01R 13/6315 439/248 |
| 6,247,964 | B1 | 6/2001 | Daoud | |
| 6,984,073 | B2 * | 1/2006 | Cox | G02B 6/3897 385/90 |
| 7,144,163 | B2 * | 12/2006 | Tanaka | G02B 6/3825 385/55 |
| 7,371,110 | B2 * | 5/2008 | Murakami | H01R 13/743 439/248 |
| 10,553,995 | B2 * | 2/2020 | Houry | H01R 13/621 |

FOREIGN PATENT DOCUMENTS

| | | |
|---|---|---|
| DE | 102013110359 A1 | 3/2015 |
| EP | 2405146 A1 | 1/2012 |
| KR | 20100079595 A * | 7/2010 |

OTHER PUBLICATIONS

Translated Description of DE 202007003258 U1. DWD Concepts GMBH. Power Distribution Device for Cabinet or Control Wall Accessible From Both Sides, Has Surface of Sleeved Socket Outlet Element Provided With Spaced Latching Devices. May 10, 2007.*
Abstract of DE202007003258(U1), 1 p.
International Search Report from the inpi, dated Apr. 16, 2021, 10 pp.
German Office Action, dated May 7, 2020, 4 pages.

* cited by examiner

CONTACT CARRIER FOR PROVIDING ELECTRICAL CONTACT FOR WIRING IN A VEHICLE

CROSS-REFERENCE TO RELATED APPLICATION

This application claims the benefit of the filing date under 35 U.S.C. § 119(a)-(d) of German Patent Application No. 102019118816.4, filed on Jul. 11, 2019.

FIELD OF THE INVENTION

The present invention relates to a contact carrier and, more particularly, to a contact carrier for wiring in a vehicle.

BACKGROUND

A plurality of electrical contacts are combined on a common contact carrier in order to wire a plurality of electrical components, for example in a cable harness in a vehicle. In this manner, a multiplicity of electrical contacts and electrical connections in a minimum of space can be obtained through only one component.

Contact carriers are employed in many technical areas, such as vehicle technology. Contact carriers are installed at a wide range of locations inside the vehicle and are used to wire the respective components of the vehicle. In order to fix the cable harness, contact carriers are normally attached at various locations on a frame structure or housing structure inside the vehicle. The contact carriers to be installed must be able to be attached to different components of varying thicknesses. Compensating for the different wall thicknesses is normally achieved by employing appropriate compensating elements, such as shims, for example. However, such solutions can lead to inadequate attaching and, if applicable, can lead to the contact carrier being released while the vehicle is in operation.

SUMMARY

A contact carrier includes a carrier body receiving a plurality of contacts and a fastening element fastening the carrier body to a carrier element. The fastening element includes a first clamping element connected to the carrier body, a second clamping element formed on the carrier body in a shiftable manner and opposite the first clamping element, and a locking device locking the second clamping element in a position relative to the first clamping element. A distance between the first clamping element and the second clamping element can be varied by a relative movement of the second clamping element in relation to the first clamping element. The first clamping element and the second clamping element, by the locking device, exert a clamping force onto the carrier element arranged between the first clamping element and the second clamping element to hold the carrier element.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the present disclosure will be described hereinafter in detail with reference to the attached drawings. The present disclosure may, however, be embodied in many different forms and should not be construed as being limited to the embodiments set forth herein; rather, these embodiments are provided so that the present disclosure will convey the concept of the disclosure to those skilled in the art. Furthermore, several aspects of the embodiments may form—individually or in different combinations—solutions according to the present invention. The following described embodiments thus can be considered either alone or in an arbitrary combination thereof.

Figure 1:
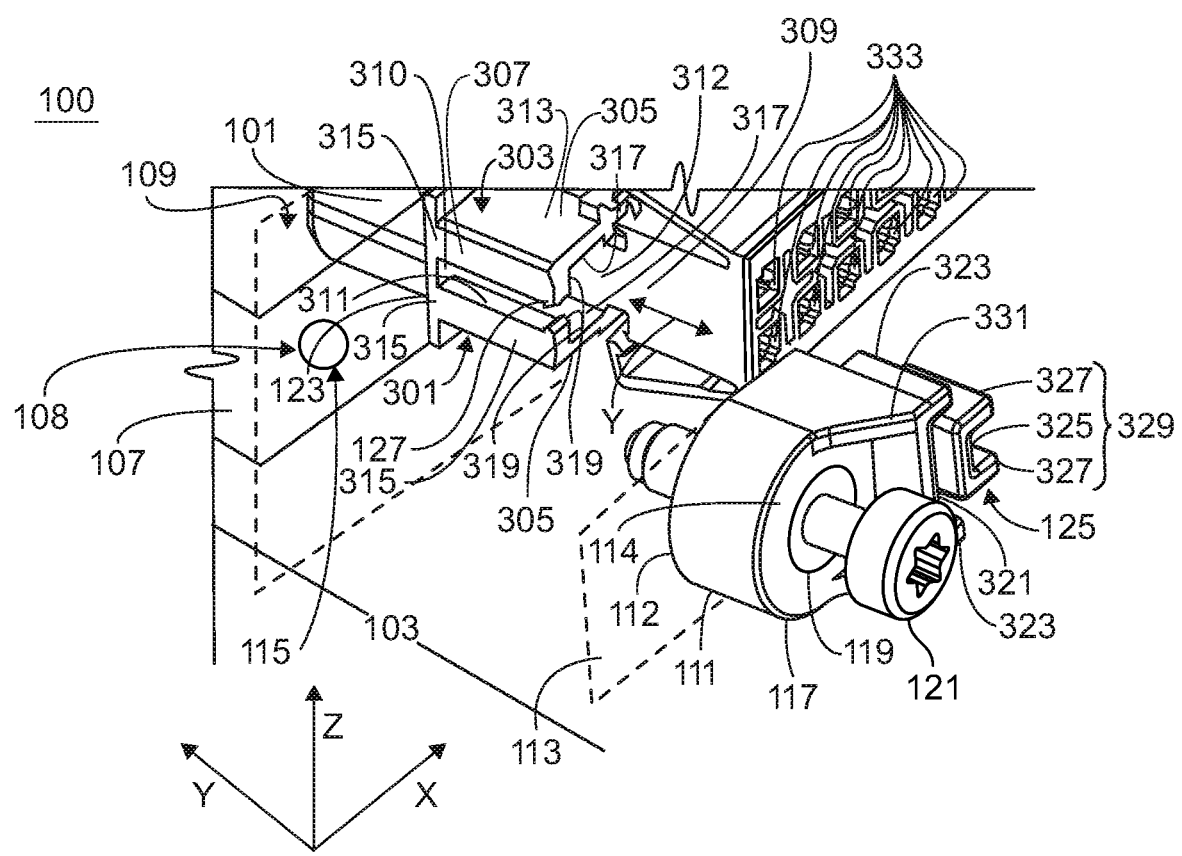
FIG. 1 is a perspective view of a contact carrier according to an embodiment with a second clamping element released from a carrier body.
Figure 2:
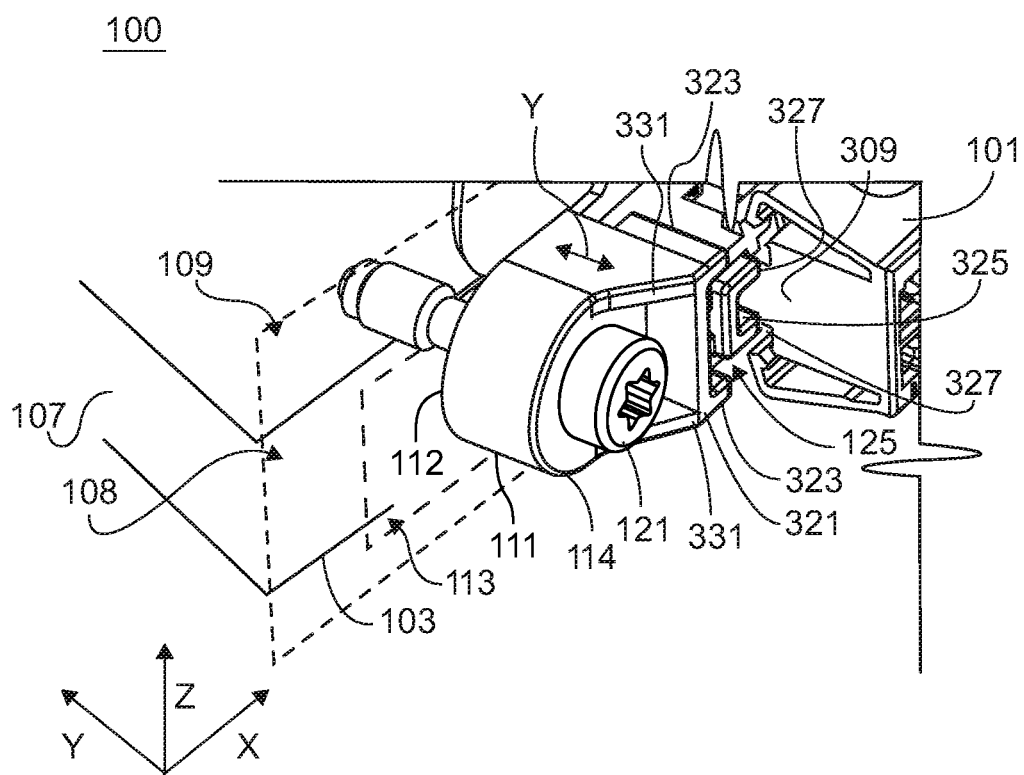
FIG. 2 is a perspective view of the contact carrier with the second clamping element fixed on the carrier body.

A contact carrier 100 according to an embodiment is shown in FIGS. 1 and 2. To allow improved understanding, where possible, the contact carrier 100 in FIG. 1 and FIG. 2 is described in conjunction with the contact carrier 100 in FIG. 6 and FIG. 7.

FIG. 1 shows a schematic perspective view of the contact carrier 100 with a carrier body 101, a first clamping element 107, and a second clamping element 111 according to an embodiment, wherein the second clamping element 111 is released from the carrier body 101. The carrier body 101 can be any component of a vehicle to which a contact carrier 100 is intended to be fastened to provide wiring in the vehicle. For example, a carrier body 101 can be a housing element or an element of a covering, a bodywork or the like.

According to an embodiment, the carrier body 101 and/or the first clamping element 107 and/or the second clamping element 111 are made of plastic, for example an injection-molding method. The first clamping element 107 may be formed by a snap-latch connection, an adhesive connection, a screw connection or integrally on the carrier body 101.

As shown in FIG. 1, the contact carrier 100 serves to provide electrical contact for wiring in a vehicle and comprises the carrier body 101 for receiving a plurality of contacts, and at least one fastening element 103 for fastening the carrier body 101 to a carrier element 105.

Figure 6:
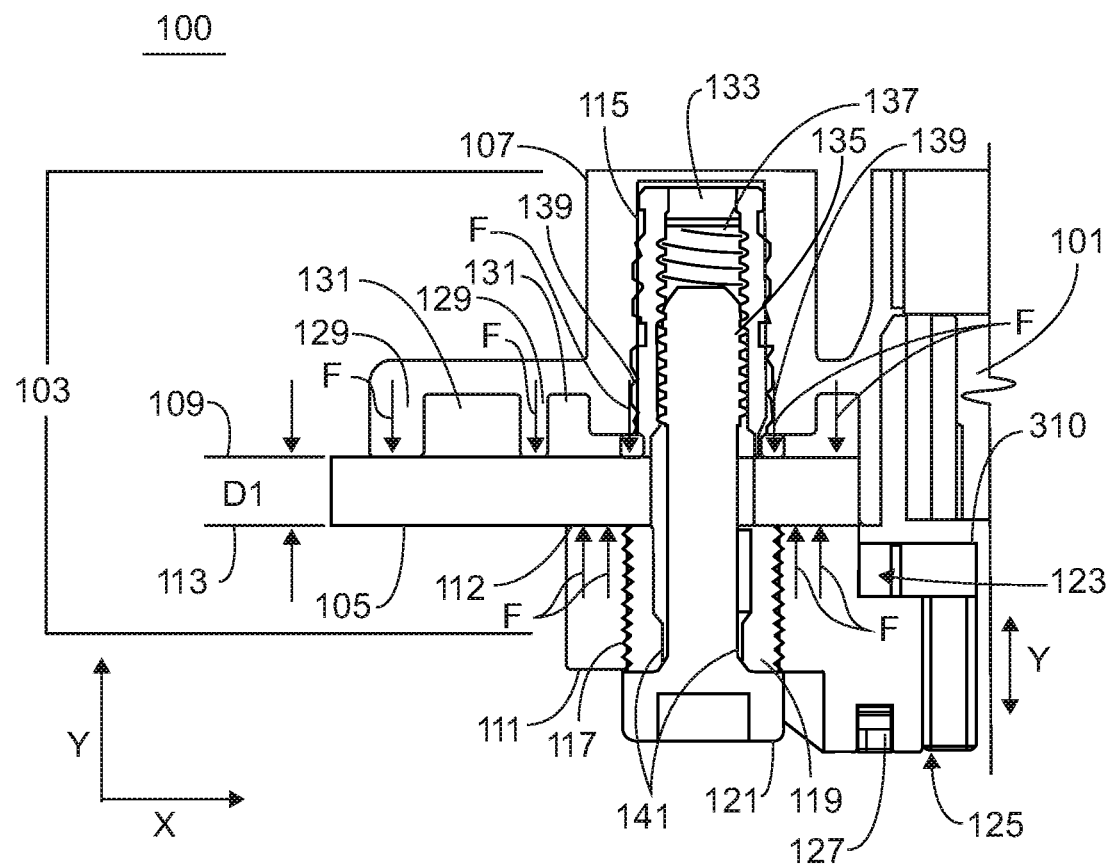
FIG. 6 is a sectional side view of a contact carrier according to an embodiment.
Figure 7:
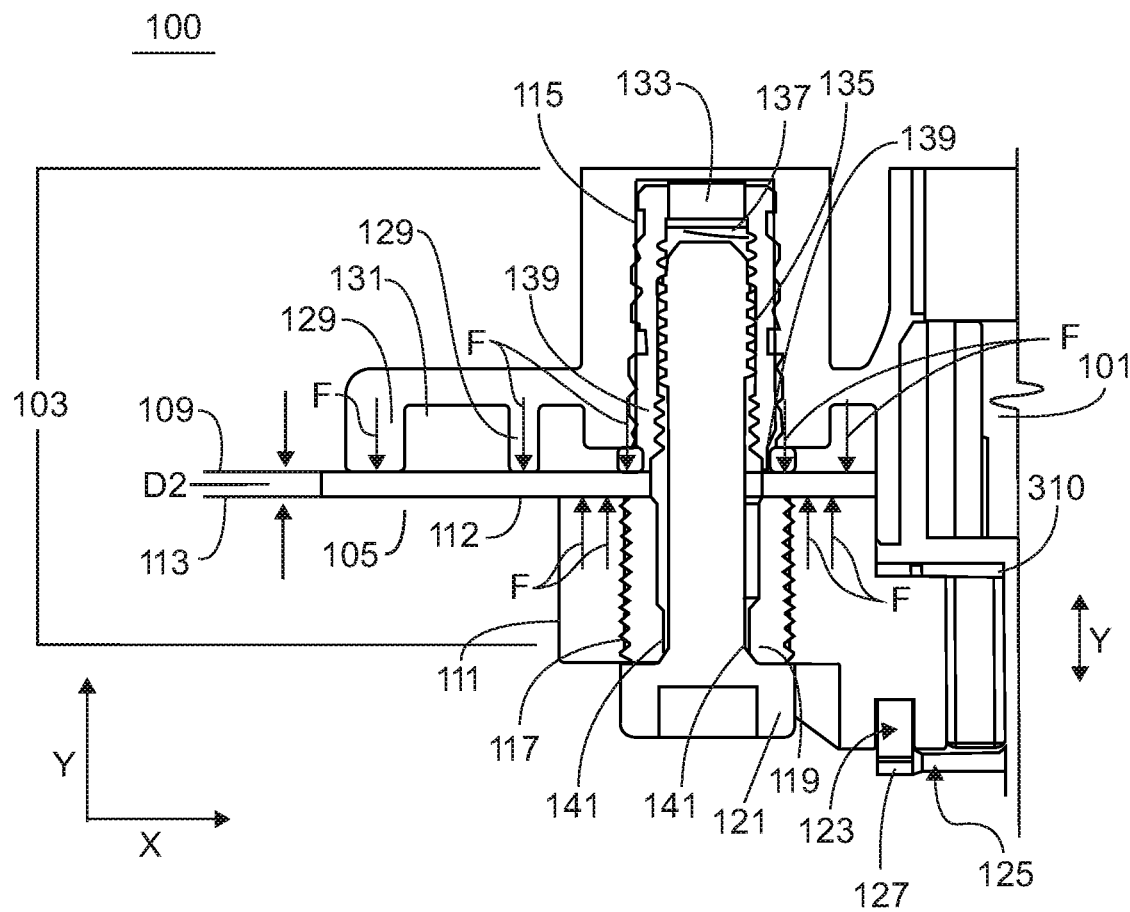
FIG. 7 is a sectional side view of a contact carrier according to another embodiment.

The fastening element 103, as shown in FIG. 1, includes a first clamping element 107 connected to the carrier body 101, a second clamping element 111 formed on the carrier body 101 in a shiftable manner and opposite the first clamping element 107, and a locking device 121 in order to lock the second clamping element 107 in a position relative to the first clamping element 107. By a relative movement of the second clamping element 111 in relation to the first clamping element 107, a distance between the first clamping element 107 and the second clamping element 111 can be varied, and the first clamping element 107 and the second clamping element 111 are, by the locking device 121, formed to exert a clamping force F onto a carrier element 105 that can be arranged between the first and second clamping elements 107, 111, as shown in FIGS. 6 and 7, and to hold said carrier element 105. According to an embodiment, the locking device 121 is a bolt element or a rivet element.

According to the embodiment in FIG. 1, the carrier body 101 is formed as a rectangular carrier body and has a plurality of contact elements 333 arranged alongside one another in a double row. However, according to another embodiment, the carrier body 101 can likewise have a different shape with a different arrangement of the contact elements 333. The number of the contact elements 333 depicted in FIG. 1 is also to be interpreted as an exemplary embodiment. According to an embodiment, the at least one fastening element 103 is arranged on one side of the contact carrier 100 having a plurality of contact elements 333. In an embodiment, more than one fastening element 103 is formed on the contact carrier 100, on different sides of the contact carrier 100.

The carrier body 101 is connected to the first clamping element 107. The nature of the connection between the carrier body 101 and the first clamping element 107 is not depicted in FIG. 1, and can be a snap-latch connection, an adhesive connection or a screw connection, for example. Alternatively, the carrier body 101 and the first clamping element 107 can also be formed integrally.

The first clamping element 107 has a receiving space 115 for receiving a locking device 121. The first clamping element 107 is formed as a rectangular clamping element in FIG. 1, wherein a first clamping wall 108 defines a first clamping plane 109. In the arrangement in FIG. 1, the first clamping wall 108 and thus the first clamping plane 109 are arranged in the xy plane.

The second clamping element 111 is depicted released from the carrier body 101 in FIG. 1. The second clamping element 111 has a second clamping wall 112, which serves to define a second clamping plane 113. In the exemplary embodiment depicted in FIG. 1, the second clamping plane 113 is arranged parallel to the first clamping plane 109. The second clamping element 111 has a guiding aperture 117 in which a guiding sleeve element 119 is arranged. The guiding aperture 117 runs through the second clamping element 111. The locking device 121 is arranged in the guiding sleeve element 119. In the embodiment depicted in FIG. 1, the locking device 121 is a screw element. According to an embodiment, the guiding sleeve element 119 is made of metal.

The second clamping element 111 has a guiding body 125. The guiding body 125 has a sliding body 329, which is formed as a U-shaped or yoke-shaped body in the embodiment shown, and a bridge element 325 with two flank elements 327 formed perpendicular to the bridge element 325. The guiding body 125 is arranged on a sliding wall 321. In the arrangement shown, the sliding surface 321 is situated in the yz-plane. In a different embodiment, the sliding body 329 can also have a shape which deviates from that shown in FIG. 1.

The second clamping element 111 has two guiding rails 323, which are each formed laterally beside the guiding body 125 on the sliding surface 321, as shown in FIG. 1. The guiding rails 323 are formed as elongated wall elements. The sliding wall 321 is arranged at right angles to the second clamping wall 112. The second clamping element 111 has a support wall 114 arranged parallel to the second clamping wall 112. The second clamping element 111 has two slanted reinforcing walls 331, which constitute a connection between the support wall 114 and the sliding wall 321. Only one of the two reinforcing walls 331 is visible in FIG. 1.

The first clamping element 107, the second clamping element 111, and the locking device 121 can be formed to be releasable from the carrier body 105, or can be connected to the carrier body 105, so that the contact carrier 100 includes, as a complete unit, the carrier body 105, the first and second clamping elements 107, 111 fastened to the carrier body 105, and the locking device 121 which are connected to the first clamping element 107 and/or to the second clamping element 111.

The carrier body 101, as shown in FIG. 1, has a guide 123, which has a first guiding element 301 and a second guiding element 303. The first guiding element 301 and the second guiding element 303 each have a first guiding wall 305 and a second guiding wall 307. The two first guiding walls 305 are formed at a third guiding wall 309 of the carrier body 101. The two first guiding walls 305 of the first guiding element 301 and of the second guiding element 303 are arranged opposite one another. The second guiding walls 307 of the first and second guiding elements 301, 303 are each arranged at a right angle to the first guiding wall 305, wherein the second guiding wall 307 of the first guiding element 301 points in the direction of the second guiding element 303, and the second guiding wall 307 of the second guiding element 303 points in the direction of the first guiding element 301.

The first guiding walls 305, the second guiding walls 307 and the third guiding wall 309 define a guiding space 312. A guiding gap 311, which communicates with the guiding space 312, is defined between the second guiding wall 307 of the first guiding element 301 and the second guiding wall 307 of the second guiding element 303. The first guiding walls 305 of the first and second guiding elements 301, 303 have an inner surface 317 and an outer surface 313. The second guiding walls 307 of the first and second guiding elements 301, 303 have an inner surface 319 and an outer surface 315. The guiding space 312 is continuously enclosed by the first guiding walls 305, the second guiding walls 307 and the third guiding wall 309, with the exception of the guiding gap 311.

As shown in FIG. 1, a securing element 127 in the form of a detent lug is formed at one end of the second guiding wall 307 of the first guiding element 301 and at one end of the second guiding wall 307 of the second guiding element 303, with the detent lugs of the first guiding element 301 and of the second guiding element 303 reaching into the guiding gap 311 and causing it to taper.

To fasten the second clamping element 111 to the carrier body 101, the guiding body 125, in particular the sliding body 329, is fitted into the guiding space 312. The sliding body 329 is shiftable inside the guiding space 312 in the shifting direction Y indicated by the arrow in FIG. 1. The shifting direction points along the guide and is indicated by the arrow. The shifting direction Y points both in the direction of the first clamping element 107 and in the opposite direction away from it.

A fitting of the guiding body 125 into the guiding space 312 is a close-fitting bearing of the guiding body 125 in the guiding space 312. The close-fitting bearing precludes any twisting of the guiding body 125 in the guiding space 312. The guiding body 125 can be shifted solely along the guiding direction Y in the guiding space 312. Canting, tilting or twisting of the guiding body 125 is not possible. As a result, a secured guiding can be provided which solely enables a shifting of the second clamping element 111 relative to the carrier body 101 along the guiding direction Y. Due to the fact that the guiding body 125 cannot be tilted, canted or twisted in the guiding space 312, the second clamping element 11 is thus likewise arranged on the carrier body 101 in a non-tiltable, non-cantable and non-twistable manner.

The bridge element 325 and the two flank elements 327 can each be arranged at an angle to one another, such that a fitting of the sliding body 329, defined as a result of this, into the guiding space 312 is enabled. Through the abutment of the bridge element 325 and the flank elements 327 on the respective inner surfaces of the first and second guiding walls 305, 307, a slideable bearing of the sliding body 329 in the guiding space 312 is guaranteed.

The orientation of the second clamping element 111 relative to the carrier body 101 is thus fixed and can only be altered by shifting in the shifting direction. Furthermore, the orientation of the second clamping plane 113, which is defined by the second clamping wall 112 of the second clamping element 111, is fixed by way of the fixed orientation of the second clamping element 111. By way of the fixed orientation of the second clamping plane 113, which is arranged parallel to the first clamping plane 109 of the first clamping element 107, a secured clamping of the frame part between the first clamping plane 109 and the second clamping plane 113 can be guaranteed.

The guiding space 312 and the guiding gap 311 are delimited by a delimiting wall 310, as shown in FIG. 1. The delimiting wall 310 is in each case arranged at a right angle to the first, second and third guiding walls 305, 307, 309. The guiding gap 311 is thus delimited in the guiding direction Y by the delimiting wall 310 and the securing element 127. Opposite the delimiting wall 310, the guiding space 312 has an aperture. The sliding body 329 of the guiding body 125 of the second clamping element 111 can be introduced into the guiding space 312 via the aperture.

For reasons of clarity, a carrier element 105 is not depicted in FIG. 1. A carrier element 105 can be any element of a vehicle to which a contact carrier 100 is to be fastened for the wiring.

In a different embodiment, the sliding body 329 of the guiding body 125 of the second clamping element 111, as well as the guide 123, can also be formed differently to the shape depicted in FIG. 1, as long as it is guaranteed that the sliding body 329 shiftably fits in the guiding space 312.

FIG. 1 depicts only one fastening element 103, which is formed laterally on the carrier body 101. In a further embodiment, the contact carrier 100 can also have a plurality of fastening elements 103, which are formed at various locations on the carrier body.

FIG. 2 shows a schematic perspective view of the contact carrier 100 in FIG. 1, wherein the second clamping element 111 is fixed on the carrier body 101. Unless otherwise described, the contact carrier 100 in FIG. 2 with the carrier body 101, the first clamping element 107, and the second clamping element 111 corresponds to the contact carrier 100 described with regard to FIG. 1.

To fix the second clamping element 111 to the carrier body 101, the guiding body 125 is introduced into the guide 123. For this purpose, the sliding body 329 of the guiding body 125 is pushed into the guiding space 312. Here, the bridge element 325 of the sliding body 329 contacts the inner surfaces 319 of the second guiding walls 307 of the first and second guiding elements 301, 303. The flank elements 327 of the sliding body 329 contact the inner surfaces 317 of the first guiding walls 305 of the first and second guiding elements 301, 303. Furthermore, the sliding wall 321 rests on the outer surface 315 of the second guiding walls 307 of the first and second guiding elements 301, 303. Furthermore, the two guiding rails 323, which are respectively formed, orientated parallel to the guiding body 125, at two opposing ends of the sliding wall 321, contact the outer surface 313 of the first guiding wall 305 of the first and second guiding elements 301, 303.

Tilting, canting or twisting of the second clamping element 111 in relation to the carrier body 101 is prevented by the shiftable fitting of the sliding body 329 into the guiding space 312 and the above-described contacting of the elements of the sliding body 329 and of the first and second guiding walls 305, 307, and also by the resting of the sliding wall 321 on the second guiding walls 307 and the resting of the guiding rails 323 on the first guiding walls 305. The second clamping element 111 is shiftable relative to the carrier body 101 in the guiding direction Y between the delimiting wall 310 and the securing element 127 of the guide 123.

When the sliding body 329 is shiftably fitted into the guiding space 312, the bridge element 325 abuts on inner surfaces of the second guiding walls 307, the two flank elements 327 each abut on an inner surface of the first guiding walls 305 and the sliding wall 321 abuts on an outer surface of the second guiding walls 307 of the first and second guiding elements 301, 303. The guiding rail 323 can be arranged on the sliding wall 321 at a distance which corresponds to a thickness of the first or second guiding wall 305, 307, such that, when the sliding body 329 is fitted into the guiding space 312, the sliding body 329, via one of the flank elements 327, abuts in a close-fitting manner on the inner surface of the first or second guiding wall 305, 307, and the guiding rail 323 abuts in a close-fitting manner on the outer surface of the first and/or second guiding wall 305, 307.

By pushing the second clamping element 111 into the guide 123 as shown in FIG. 2, the locking device 121 is introduced into the receiving space 115 of the first clamping element 107. Thus, the second clamping element 111 can be locked on the first clamping element 107 via the locking device 121.

Through the locking of the second clamping element 111 by the locking device 121, a clamping force F can be exerted onto a carrier element 105 arranged between the first and second clamping planes 109, 113, and thus the carrier element 105 can be clamped between the first clamping element 107 and the second clamping element 111, and thus the contact carrier 100 can be fixed on the carrier element 105. The carrier element 105 is shown in FIGS. 6 and 7.

The carrier element 105 is introduced into a space between the first clamping plane 109 and the second clamping plane 113. A distance between the first clamping plane 109, defined by the first clamping element 107, and the second clamping plane 113, defined by the second clamping element 111, can be varied by virtue of the shifting of the second clamping element 111 in guiding direction Y relative to the carrier body 101. A surface of the second clamping wall 112 of the second clamping element 111 contacts a surface of the carrier element 105. By way of the locking device 121, the second clamping element 111 can be locked in this position, and can produce the clamping force F which acts via the first clamping element 107 and the second clamping element 111 on the carrier element 105 arranged between them. The carrier element 105 is thus held between the first clamping element 107 and the second clamping element 111.

As a result of this, it is possible to compensate for wall thickness, and carrier elements 105 of differing wall thickness can be clamped by the first clamping element 107 and the second clamping element 111. Additional compensating devices, such as shims for example, are not required in order to clamp carrier elements 105 of differing wall thickness between the first clamping element 107 and the second clamping element 111.

Figure 3:
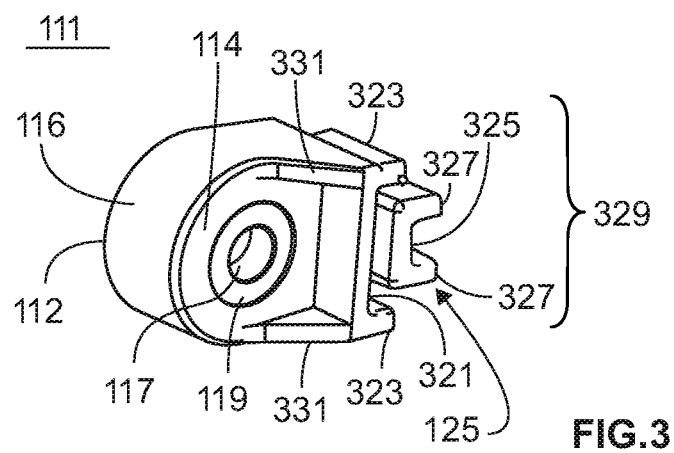
FIG. 3 is a front perspective view of a second clamping element of a contact carrier according to an embodiment.

A second clamping element 111 of a contact carrier 100 according to an embodiment is shown in FIG. 3. FIG. 3 depicts the second clamping element 111 without a corresponding locking device 121 as depicted in the preceding figures. In the embodiment, the second clamping element 111 from FIG. 3 corresponds to the second clamping element 111 from the preceding figures.

The guiding aperture 117, which runs between the second clamping wall 112 and the support wall 114, is visible in FIG. 3. In the guiding aperture 117, a guiding sleeve element 119 is formed for receiving and guiding the locking device 121. Opposite the sliding wall 321, the second clamping element 111 has a rounded wall 116 with a radius. The rounded wall 116 enables the second clamping element 111 to be formed with the greatest possible saving of material and avoids unnecessary corners which could lead to damage during use.

Figure 4:
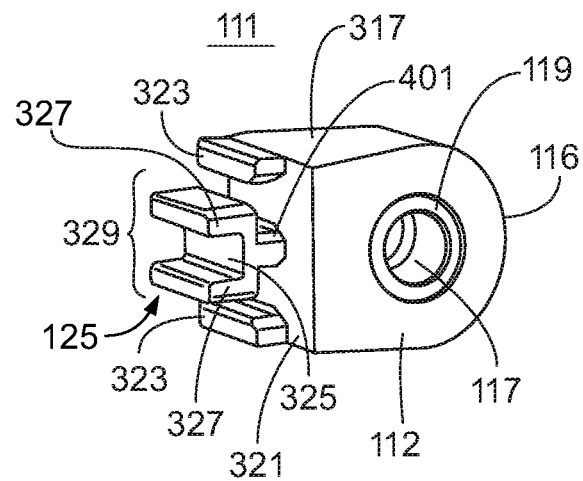
FIG. 4 is a rear perspective view of the second clamping element of FIG. 3.

FIG. 4 depicts a schematic perspective rear view of the second clamping element 111 from FIG. 3. FIG. 4 depicts the second clamping wall 112 as a planar wall. The second clamping wall 112 defines the second clamping plane 113. The sliding wall 321 is arranged at a right angle to the second clamping wall 112.

According to the embodiment in FIG. 4, the guiding body 125 has a sliding bar 401 alongside the U-shaped or yoke-shaped sliding body 329. The sliding body 329 is formed on the sliding wall 321 via the sliding bar 401. The sliding bar 401 runs parallel to the two guiding rails 323 and is arranged in the center in relation to the two guiding rails 323. The bridge element 325 is formed on the sliding bar 401 and is arranged parallel to the sliding wall 321.

According to the embodiment in FIG. 4, the sliding body 329 extends along the two guiding rails 323. The two flank elements 327 of the sliding body 329 are arranged parallel to the two guiding rails 323. As a result, canting or tilting or twisting of the sliding body 329 inside the guiding space 312 is avoided. By virtue of the arrangement of the guiding body 125 and the two guiding rails 323 on the sliding wall 321 of the embodiment of the second clamping element 111 shown in FIG. 4, the second clamping element 111 is prevented from canting, tilting or twisting relative to the carrier body 101 when the second clamping element 111 is arranged in the guide 123.

When the guiding body 125 is arranged in the guide 123 of the embodiment depicted in FIGS. 1 and 2, the sliding bar 401 is shiftably fitted into the guiding gap 311. The sliding bar 401 is thus shiftable inside the guiding gap 311 between the delimiting wall 310 and the securing element 127. Via the detent lugs of the securing element 127 which are shown in FIG. 1, the guiding gap 311 is tapered and the sliding bar 401 is prevented from sliding out of the guiding gap 311. However, through the flexible configuration of the first and second guiding walls 305, 307 of the first and second guiding elements 301, 303, which can each be manufactured from plastic, the sliding bar 401 can be removed from the guiding gap 311 by applying an appropriate pushing force or pulling force, and the second clamping element 111 can be separated from the carrier body 101. The securing element 127 thus enables a releasable connection of the second clamping element 111 to the carrier body 105, this connection allowing secure connection of the second clamping element 111 to the carrier body 105, and also a detachment of the second clamping element 111 from the carrier body 105.

The sliding body 329, which is fitted into the guiding space 312, can be shifted solely along the guiding direction Y in the guiding space 312. The formation of the guiding space 312 by the first guiding walls 305, the second guiding walls 307 and the third guiding wall 309 does not allow the guiding body 125 to be removed from the guiding space 312 in a direction orientated perpendicular to the guiding direction Y. The guiding gap 311 defined by the second guiding walls 307 extends along the guiding direction Y. The sliding bar 401, which is fitted into the guiding gap 311 and which connects the sliding body 329 to the sliding wall 321 of the second clamping element 111, additionally contributes to preventing the second clamping element 111 from tilting, canting or twisting relative to the carrier body 105.

When the sliding body 329 is fitted in the guiding space 312 and the sliding bar 401 is fitted in the guiding gap 311, the sliding wall 321 is situated outside the guide. The sliding wall 321 can rest on a surface of the carrier body 105 when the sliding body 329 is fitted in the guiding space 312, such that a precise shifting of the second clamping element 11 is enabled along the guiding direction Y relative to the carrier body 105.

Figure 5:
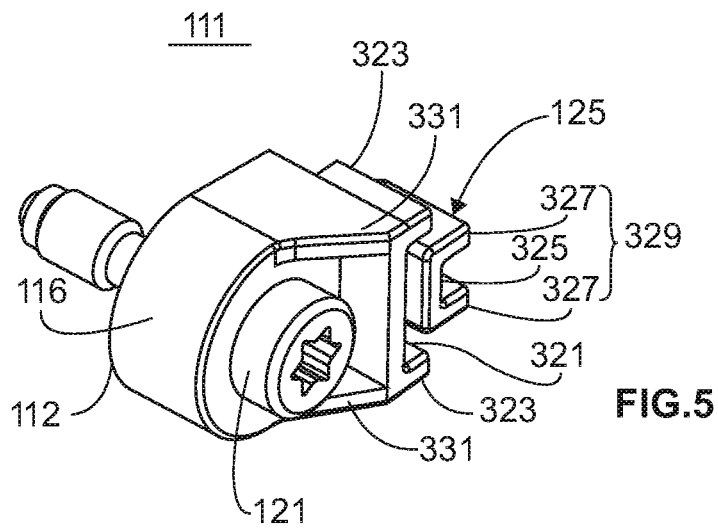
FIG. 5 is a perspective view of the second clamping element of FIG. 3 with a locking device.

FIG. 5 shows a further schematic perspective front view of the second clamping element 111 from FIG. 3 with the locking device 121.

FIG. 6 shows a schematic sectional view of a contact carrier 100 according to an embodiment. Unless otherwise described, the contact carrier 100 depicted in FIG. 6 and FIG. 7 with the carrier body 101, the first clamping element 107 and the second clamping element 111 corresponds to the contact carrier 100 described with regard to FIG. 1 and FIG. 2.

The contact carrier 100 depicted in FIG. 6 has the carrier body 101, the first clamping element 107 and the second clamping element 111. For reasons of clarity, the carrier body 101 is depicted merely in outline. The second clamping element 111 is arranged in the guide 123. The second clamping element 111 is locked with the first clamping element 107 via a locking device 121. In the embodiment shown in FIG. 6, the locking device 121 is a screw element. The first clamping element 107 has the receiving space 115, in which a receiving sleeve element 133 with an internally threaded section 137 is arranged. The second clamping element 111 has the guiding aperture 117, in which the guiding sleeve element 119 is arranged. The locking device 121 runs through the guiding sleeve element 119 and the receiving sleeve element 133. The locking device 121 has an externally threaded section 135 and is interlocked with the internally threaded section 137 of the receiving sleeve element 133 via this externally threaded section 135.

The second clamping element 111 defines the second clamping plane 113 via the second clamping wall 112. In contrast to the embodiment depicted in FIGS. 1 and 2, the first clamping element 107 in the embodiment depicted in FIGS. 6 and 7 has no first clamping wall 108. Instead, the first clamping element 107 is formed with a plurality of contact bars 129 and a plurality of recesses 131. The receiving sleeve element 133 additionally has an annular contact ring element 139. The first clamping plane 109 of the first clamping element 107 is defined via the contact bars 129 and the contact ring element 139. The first clamping plane 109 is arranged opposite the second clamping plane 113. In the embodiment depicted in FIG. 6, the first and second clamping planes 109, 113 are arranged parallel to one another.

As shown in FIG. 6, a carrier element 105 is arranged between the first clamping plane 109 and the second clamping plane 113. As already mentioned above, the carrier element 105 can be any component of a vehicle to which a contact carrier 100 is intended to be fastened to provide wiring. The carrier elements 105 can have different wall thicknesses between 0.1 mm and 10 mm and can be clamped in the space between the first and second clamping elements 107, 111. Alternatively, carrier elements 105 with different wall thicknesses are conceivable.

Via the locking of the second clamping element 111 on the first clamping element 107 by the locking device 121, a clamping force F, which is depicted by the arrows pointing in the y-direction, is exerted onto the carrier element 105 by the first clamping element 107 and the second clamping element 111. As a result, the carrier element 105 is fixed between the first and second clamping planes 109, 113, and the contact carrier 100 is fastened to the carrier element 105.

The guiding sleeve element 119 has a securing section 141, as shown in FIG. 6, which is formed as an annular taper at one end of the guiding sleeve element 119. The locking device 121 can be held in the guiding sleeve element 119 via the securing section 141. As a result, the locking device 121 is prevented from being unintentionally released from the second clamping element 111. The configuration of the first clamping element 107 with the plurality of recesses 131 and contact bars 129 enables a lightweight design and the consumption of as little material as possible.

FIG. 7 shows a further schematic sectional view of the contact carrier 100 according to an embodiment. In FIG. 7, as compared to FIG. 6, a carrier element 105 with a lower wall thickness is clamped between the first clamping plane 109 and the second clamping plane 113. By shifting the second clamping element 111 in the guide 123 in the guiding direction Y, it is possible to compensate for the reduced wall thickness of the carrier element 105. By the configuration of the guide 123 as described above, which makes it possible to shift the second clamping element 111 in the guiding direction Y relative to the carrier body 101 without canting, tilting or twisting the second clamping element 111 relative to the carrier body 101, the orientation, in particular an angle between the first and second clamping planes 109, 113, can be maintained despite the shifting of the second clamping element 111. As in FIG. 6, the first and second clamping planes 109, 113 are arranged parallel to one another in FIG. 7.

In contrast to FIG. 6, in which the first and second clamping planes 109, 113 have a first distance D1 from one another due to the greater wall thickness of the carrier element 105, the first and second clamping planes 109, 113 have a second distance D2 from one another in FIG. 7.

Via the second clamping wall 112 of the second clamping element 111, which second clamping wall 112 defines the second clamping plane 113 and fully abuts on the carrier element 105, it is possible to obtain a uniform distribution of the clamping force F onto the second clamping element 111. As a result, secure holding of the carrier element 105 between the first clamping element 107 and the second clamping element 111 can be promoted.

What is claimed is:

1. A contact carrier comprising:
   a carrier body receiving a plurality of contacts; and
   a fastening element fastening the carrier body to a carrier element, the fastening element includes:
   a first clamping element connected to the carrier body;
   a second clamping element formed on the carrier body in a shiftable manner and opposite the first clamping element; and
   a locking device having an insertion axis locking the second clamping element in a position relative to the first clamping element, a distance between the first clamping element and the second clamping element can be varied by a relative movement of the second clamping element in relation to the first clamping element along the insertion axis, the first clamping element and the second clamping element, by the locking device, exert opposing clamping forces in a force direction parallel to the insertion axis and onto the carrier element arranged between the first clamping element and the second clamping element to hold the carrier element,
   wherein the carrier body has a guide and the second clamping element has a guiding body that interacts with the guide and is shiftable along the guide in a guiding direction relative to the carrier body, the guiding body including a sliding body and a sliding bar, the sliding body is formed as a U-shaped body and has a bridge element and a pair of flank elements angled at the bridge element, the bridge element is formed on the sliding bar and is arranged parallel to the sliding wall, the sliding body connected to the sliding wall of the second clamping element via the sliding bar, the sliding body can be fitted and is shiftable in the guiding space and the sliding bar can be fitted and is shiftable in the guiding gap.

2. The contact carrier of claim 1, wherein the guide has a first guiding element and a second guiding element opposite the first guiding element, the first guiding element and the second guiding element are formed on the carrier body along the guiding direction and define a guiding space between them.

3. The contact carrier of claim 2, wherein the guiding body can fit in the guiding space and is shiftable along the guiding direction in the guiding space.

4. The contact carrier of claim 3, wherein the first guiding element and the second guiding element each have a first guiding wall and a second guiding wall forming an angle with one another, the first guiding walls of the first guiding element and the second guiding element are arranged opposite one another and are formed at a third guiding wall of the carrier body.

5. The contact carrier of claim 4, wherein a guiding gap is defined between the second guiding walls, the guiding space communicates with the guiding gap and is defined between the first guiding walls, the second guiding walls, and the third guiding wall.

6. The contact carrier of claim 1, wherein, when the sliding body is shiftably fitted into the guiding space, the bridge element abuts on an inner surface of the second guiding walls, the flank elements each abut on an inner surface of the first guiding walls, and the sliding wall abuts on an outer surface of the second guiding walls.

7. The contact carrier of claim 1, wherein the second clamping element has a guiding rail arranged laterally distanced from the guiding body on the sliding wall, the guiding rail abuts on an outer surface of the first guiding wall of the first guiding element and/or the second guiding element when the sliding body is shiftably fitted in the guiding space.

8. The contact carrier of claim 1, wherein the guide has a first guiding element and a second guiding element, wherein the first and second guiding elements each have a second guiding wall, and the contact carrier also has a securing element spatially limiting a shifting of the guiding body on the guide, the securing element preventing the guiding body from sliding out of the guide and preventing the second clamping element from separating from the carrier body.

9. The contact carrier of claim 8, wherein the securing element has a detent lug formed at an end of the second guiding wall of the first guiding element and/or the second guiding element.

10. The contact carrier of claim 1, wherein the second clamping element can be released from the carrier body.

11. The contact carrier of claim 1, wherein the fastening element is arranged on a side of the contact carrier, the contact carrier having a plurality of contact elements.

12. The contact carrier of claim 1, wherein the carrier body and/or the first clamping element and/or the second clamping element are made of plastic.

13. The contact carrier of claim 1, wherein the locking device is substantially cylindrical in cross-section.

14. A contact carrier comprising:
a carrier body receiving a plurality of contacts; and
a fastening element fastening the carrier body to a carrier element, the fastening element includes:
a first clamping element connected to the carrier body;
a second clamping element formed on the carrier body in a shiftable manner and opposite the first clamping element, wherein the first clamping element has a receiving space receiving the locking device and the second clamping element has a guiding aperture guiding the locking device; and
a locking device locking the second clamping element in a position relative to the first clamping element, a distance between the first clamping element and the second clamping element can be varied by a relative movement of the second clamping element in relation to the first clamping element, the first clamping element and the second clamping element, by the locking device, exert a clamping force onto the carrier element arranged between the first clamping element and the second clamping element to hold the carrier element, wherein the locking device can be introduced through the guiding aperture of the second clamping element into the receiving space of the first clamping element and can be locked in the receiving space, and wherein the locking device is a screw element with an externally threaded section and the receiving space has a receiving sleeve element with an internally threaded section for interlocking with the externally threaded section of the screw element.

15. The contact carrier of claim 14, wherein the guiding aperture has a guiding sleeve element with a securing section for guiding the locking device in the guiding aperture and for securing the locking device on the second clamping element.

16. The contact carrier of claim 15, wherein the guiding sleeve element is made of metal.

17. A contact carrier comprising:
a carrier body receiving a plurality of contacts, wherein the carrier body has a guide having a first guiding element and a second guiding element opposite the first guiding element, the first guiding element and the second guiding element formed on the carrier body along a guiding direction and defining a guiding space between them, and a second clamping element has a guiding body, the guiding body interacts with the guide and is shiftable along the guide in the guiding direction relative to the carrier body; and
a fastening element fastening the carrier body to a carrier element, the fastening element includes:
a first clamping element connected to the carrier body;
the second clamping element formed on the carrier body in a shiftable manner and opposite the first clamping element; and
a locking device locking the second clamping element in a position relative to the first clamping element, a distance between the first clamping element and the second clamping element can be varied by a relative movement of the second clamping element in relation to the first clamping element, the first clamping element and the second clamping element, by the locking device, exert a clamping force onto the carrier element arranged between the first clamping element and the second clamping element to hold the carrier element,
wherein the first guiding element and the second guiding element each have a first guiding wall and a second guiding wall forming an angle with one another, the first guiding walls of the first guiding element and the second guiding element are arranged opposite one another and are formed at a third guiding wall of the carrier body, and
wherein the guiding body includes a sliding body and a sliding bar, the sliding body is connected to a sliding wall of the second clamping element via the sliding bar, the sliding body formed as a U-shaped body and having a bridge element and a pair of flank elements angled at the bridge element, the bridge element formed on the sliding bar and arranged parallel to the sliding wall, and wherein the sliding body can be fitted and is shiftable in the guiding space and the sliding bar can be fitted and is shiftable in a guiding gap defined between the second guiding walls, the guiding space communicates with the guiding gap and is defined between the first guiding walls, the second guiding walls, and the third guiding wall.

* * * * *